United States Patent [19]

Batson

[11] 4,072,205
[45] Feb. 7, 1978

[54] IRRIGATION SYSTEM
[75] Inventor: Paul E. Batson, Springfield, Oreg.
[73] Assignee: Crown American Irrigation, Inc., Eugene, Oreg.
[21] Appl. No.: 733,179
[22] Filed: Oct. 18, 1976
[51] Int. Cl.² .............................................. B60K 17/10
[52] U.S. Cl. ................................................. 180/66 R
[58] Field of Search .............................. 180/6.6 R, 6.3
[56] References Cited
U.S. PATENT DOCUMENTS

| | | | |
|---|---|---|---|
| 2,563,519 | 8/1951 | Egly et al. ...................... | 180/66 R X |
| 3,825,087 | 7/1974 | Wilson ............................ | 180/66 R X |

Primary Examiner—Joseph F. Peters, Jr.
Assistant Examiner—Gene A. Church
Attorney, Agent, or Firm—Klarquist, Sparkman, Campbell, Leigh, Hall & Whinston

[57] ABSTRACT

A vertical shaft engine is mounted by a bracket on the side of a cart beam serving as a hydraulic reservoir. The engine drives a pump which is selectively connected by a manual valve to drive positive displacement hydraulic motors in series to rotate a bull gear. The bull gear turns a torque tube to rotate an irrigation pipe and wheels keyed to the pipe. The torque tube also drives sprockets to rotate wheels of a cart supporting the beam.

6 Claims, 5 Drawing Figures

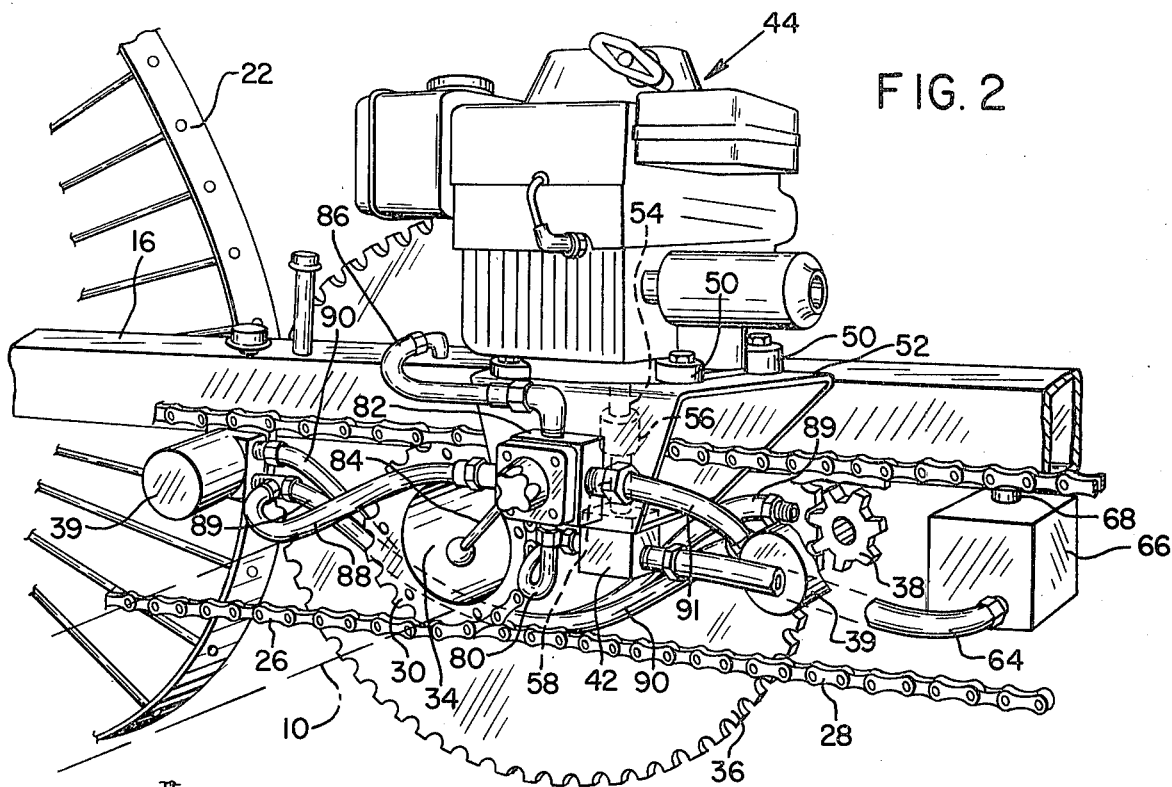
FIG. 2
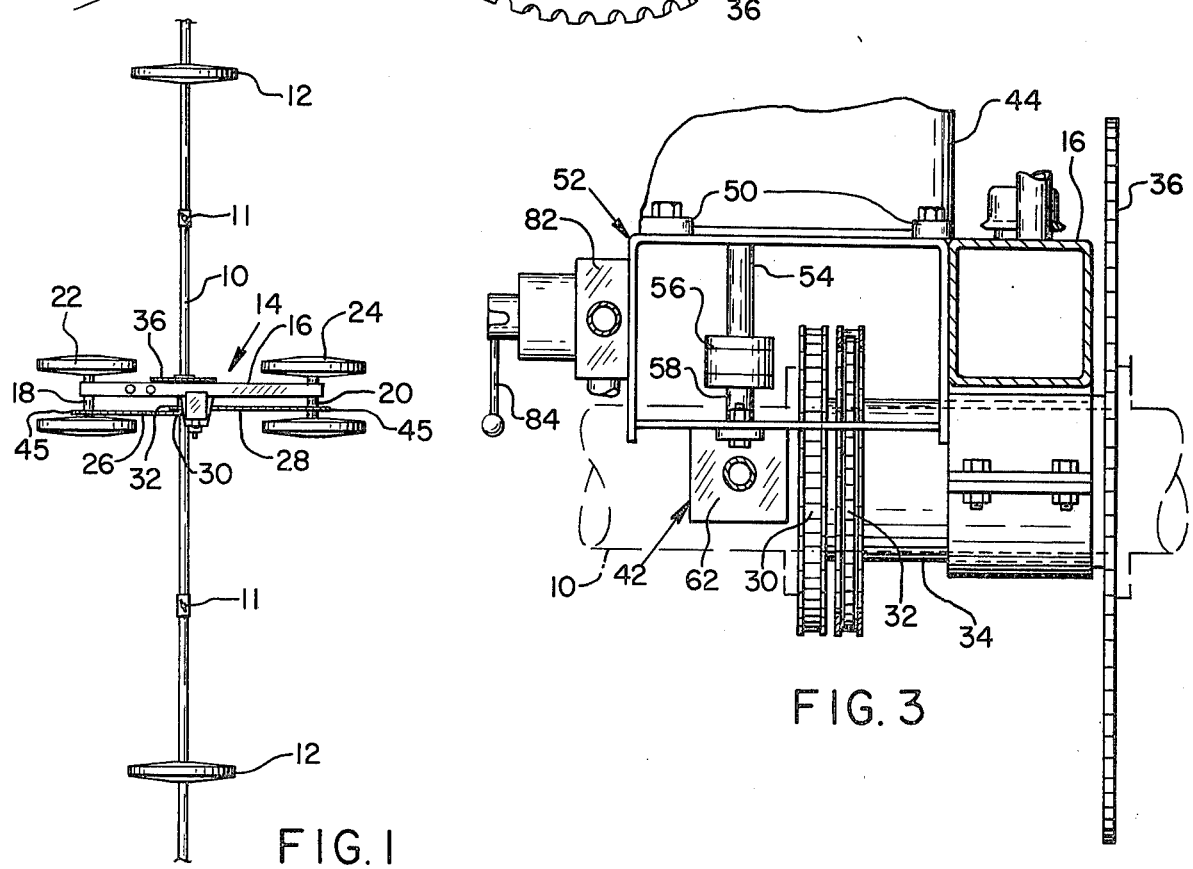
FIG. 1
FIG. 3

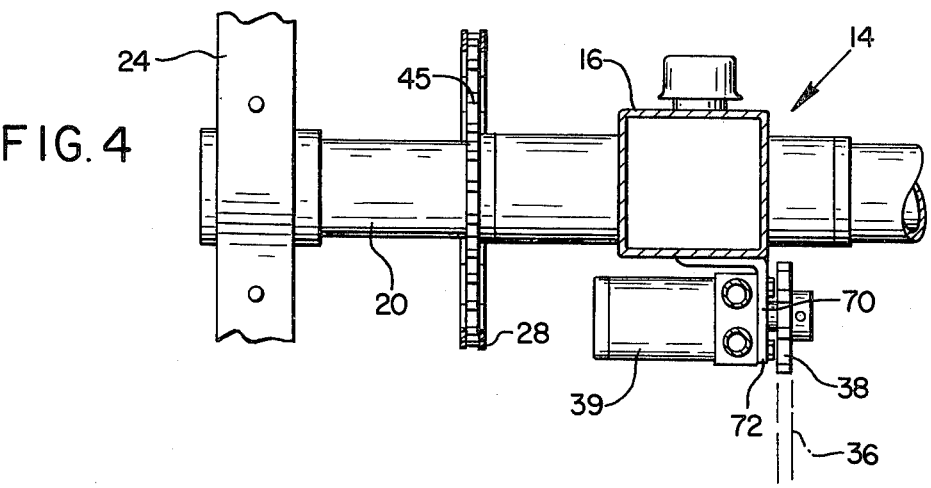
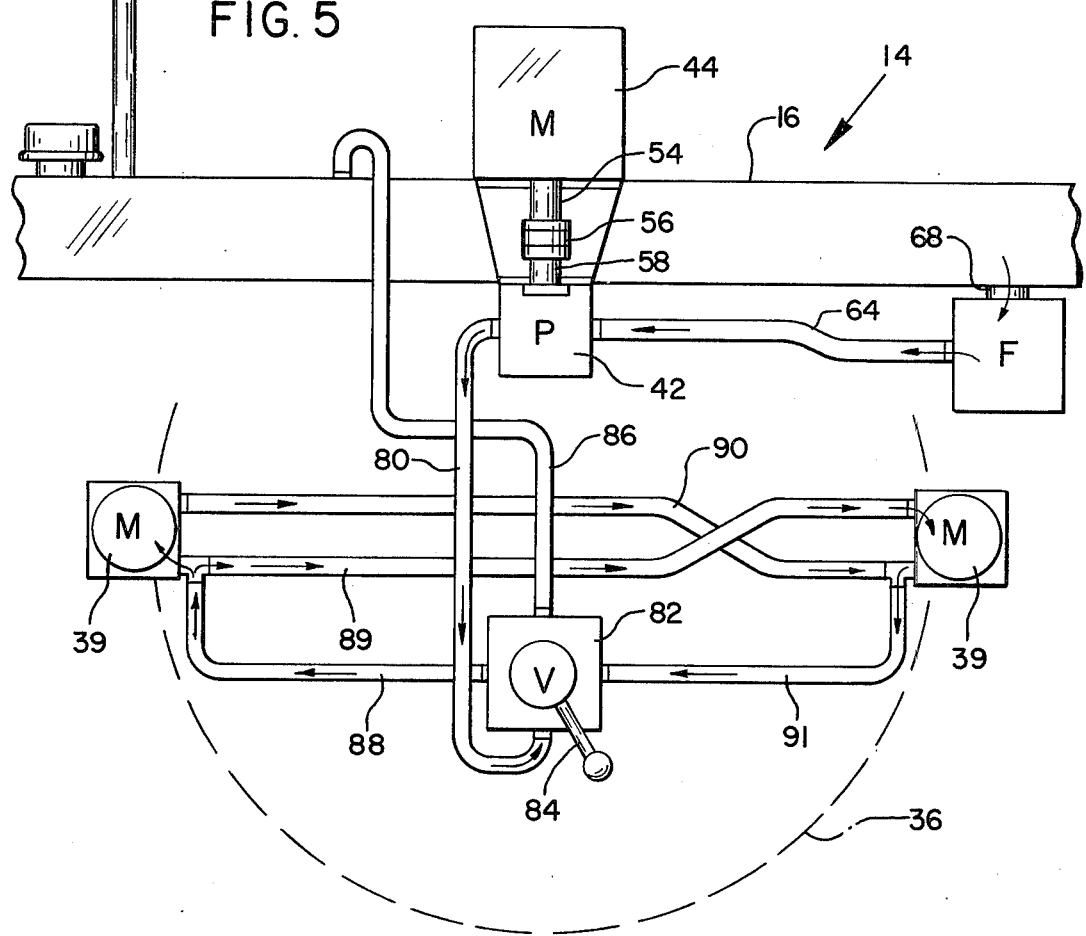

IRRIGATION SYSTEM

DESCRIPTION

This invention relates to an improved irrigation system, and has for an object thereof the provision of an improved irrigation system.

Another object of the invention is to provide a new and improved drive for a movable irrigation line.

A further object of the invention is to provide a drive for a movable irrigation line in which a vertical shaft engine is mounted on a cart beam to drive a torque tube through a hydraulic pump and series connected hydraulic motors carried by the beam.

Another object of the invention is to provide an improved irrigation system in which a tubular bracket mounted on a beam of a cart supports a vertical shaft engine on top and a pump on its bottom.

In the drawings:

FIG. 1 is a fragmentary, top plan view of an improved irrigation system forming one embodiment of the invention;

FIG. 2 is an enlarged, perspective view of the irrigation system of FIG. 1;

FIG. 3 is an enlarged vertical sectional view of the irrigation system of FIG. 1;

FIG. 4 is an enlarged vertical sectional view taken along line 4—4 of FIG. 1; and FIG. 5 is a diagrammatic view of the power system of the system of FIG. 1.

An improved irrigation system forming one specific embodiment of the invention includes the usual pipe 10 carrying sprinklers 11 and keyed to wheels 12. The pipe is supported and rotated by an improved mover or cart 14 including a tubular beam 16 closed at its ends and serving as a cart frame and as a reservoir for a hydraulic system. The beam is supported by axles 18 and 20 keyed to pairs of wheels 22 and 24, which are driven by chains 26 and 28. The chains are driven by sprockets 30 and 32 keyed to a torque tube 34 keyed to the pipe and rotated by a bull gear 36. The bull gear is driven by pinions 38 driven by positive displacement hydraulic motors 39 and 40 supplied by a positive displacement hydraulic pump 42 driven by a known, commercially available, vertical shaft gasoline engine 44. The chains drive sprockets 45 keyed to the axles.

The engine 44 has a base 50 bolted to the top of a tubular, trapezoidal, bracket 52 welded to one side of the beam 16, a drive shaft 54 extending down through a clearance hole in the top wall of the bracket and being connected by a flexible coupling 56 to a drive shaft 58 of the hydraulic pump 42 having a housing 62 bolted to the bottom wall of the bracket. The inlet of the pump receives hydraulic liquid from a hose 64 connected to a filter F carried by a short pipe 63 threaded into a socket in the bottom of the hollow beam 16 and receiving the hydraulic liquid from the beam. Strong, L-shaped brackets 70 (FIG. 4) welded to the bottom of the beam 16 have depending plates 72 mounting the hydraulic motors 39 and 40 with its pinion 38 meshing with the bull gear.

The pump 42 (FIG. 5) has its outlet line 80 connected to a manually operable valve 82 bolted to one side of the bracket 52. A handle 84 of the valve may be turned from a stop position in which the liquid flows through a return line 86 to the reservoir beam 16 of a drive position in which the hydraulic liquid under pressure from the pump is supplied to a line or hose 88 connected to hose 89 connected to the inlets of the motors 39. The motors 39 are connected to lines or hoses 90 and 91 connecting the outlets of the motors 39 and 40 to the valve 82, which, in this position, connects the line 91 to the return line 86. The handle 84 may also be moved to a position to reverse the direction of movement of the system in which the valve 82 connects the pump outlet to the hose 91 and the hose 88 to the exhaust hose 86. The handle 84 also may be set in a stop position in which the ports to the hoses 88 and 92 are both closed and the outlet 80 of the pump is connected to the return line 86.

What is claimed is:

1. In an irrigation line move,
a cart frame including a tubular beam closed at its ends and forming a hydraulic reservoir,
wheel means supporting the frame,
a tubular bracket secured to one side of the frame,
a vertical shaft engine mounted on the top of the tubular bracket having a drive shaft extending downwardly into the bracket,
a hydraulic pump mounted on the bottom of the tubular bracket and having an input shaft extending upwardly into the bracket and aligned with the drive shaft,
flexible coupling means coupling the shafts,
hydraulic motor means,
torque tube means,
gear means coupling the motor means and the torque tube means,
manually operable valve means for connecting the pump to the motor means,
and hose means connecting the beam to the valve means.

2. The mover of claim 1 wherein the pump means is at a level below the beam.

3. The mover of claim 2 wherein the valve means is mounted on the side of the bracket remote from the beam.

4. The mover of claim 1 wherein the valve means is mounted on the side of the bracket remote from the beam.

5. The mover of claim 1 wherein the gear means includes a bull gear fixed to the torque tube means and pinion gear means driven by the motor means.

6. The mover of claim 5 including a first sprocket keyed to the torque tube means, a second sprocket drivingly connected to wheel means and a chain connecting the sprockets and extending through the bracket.

* * * * *

UNITED STATES PATENT OFFICE
CERTIFICATE OF CORRECTION

Patent No. 4,072,205  Dated February 7, 1978

Inventor(s) PAUL E. BATSON

It is certified that error appears in the above-identified patent and that said Letters Patent are hereby corrected as shown below:

Col. 1, line 54, change "F" to --66--

Col. 1, line 54, change "63" to --68--

Col. 2, line 7, change "of" to --or--

Col. 2, line 44, change "mover" to --move--

Col. 2, line 46, change "mover" to --move--

Col. 2, line 49, change "mover" to --move--

Col. 2, line 52, change "mover" to --move--

Col. 2, line 55, change "mover" to --move--

Signed and Sealed this

Sixteenth Day of May 1978

[SEAL]

Attest:

RUTH C. MASON
Attesting Officer

LUTRELLE F. PARKER
Acting Commissioner of Patents and Trademarks